(12) United States Patent
Recavarren et al.

(10) Patent No.: US 11,170,015 B2
(45) Date of Patent: Nov. 9, 2021

(54) IDENTIFICATIONS OF PATTERNS OF LIFE THROUGH ANALYSIS OF DEVICES WITHIN MONITORED VOLUMES

(71) Applicants: Ed Recavarren, Apex, NC (US); Lynn Yanyo, Cary, NC (US); Brad Richardson, Cary, NC (US)

(72) Inventors: Ed Recavarren, Apex, NC (US); Lynn Yanyo, Cary, NC (US); Brad Richardson, Cary, NC (US)

( * ) Notice: Subject to any disclaimer, the term of this patent is extended or adjusted under 35 U.S.C. 154(b) by 598 days.

(21) Appl. No.: 15/658,916

(22) Filed: Jul. 25, 2017

(65) Prior Publication Data

US 2018/0032590 A1 Feb. 1, 2018

Related U.S. Application Data

(60) Provisional application No. 62/369,265, filed on Aug. 1, 2016.

(51) Int. Cl.
| | |
|---|---|
| *G06F 16/248* | (2019.01) |
| *G06F 16/28* | (2019.01) |
| *G01S 5/02* | (2010.01) |
| *H04N 5/33* | (2006.01) |

(52) U.S. Cl.
CPC ............ *G06F 16/248* (2019.01); *G01S 5/02* (2013.01); *G01S 5/0263* (2013.01); *G06F 16/284* (2019.01); *G06F 2216/03* (2013.01); *H04N 5/332* (2013.01)

(58) Field of Classification Search
CPC ............ G06F 19/3481; G06F 19/3475; G06F 12/0246; G06F 16/29; G06F 17/18; G06F 19/321
See application file for complete search history.

(56) References Cited

U.S. PATENT DOCUMENTS

| | | | |
|---|---|---|---|
| 2014/0235269 A1* | 8/2014 | Ericsson | H04W 64/003 455/456.1 |
| 2014/0350349 A1* | 11/2014 | Geurts | A61B 5/1118 600/300 |
| 2016/0156482 A1* | 6/2016 | Ichijo | G08C 17/02 709/204 |
| 2018/0276542 A1* | 9/2018 | Cheng | G06Q 30/0241 |

\* cited by examiner

*Primary Examiner* — Truong V Vo
(74) *Attorney, Agent, or Firm* — John L. Sotomayor

(57) ABSTRACT

This document presents a system to identify patterns of life associated with the users of radio frequency emitting devices radiating within a monitored volume. These recurring commonalities in human activity can be derived from collected data and subsequent analytics that provide intelligence about those emitters and associated humans present within the monitored volume. The Freya system provides unique identifiers for detected emitters; insights into the current network relationships between emitters, past and current; human relational networks within the monitored volume; and can identify previous emitter locations prior to detection by the Freya system. These patterns of life provide a foundation for predicting interactions between humans associated with emitters active on the Internet of Things (IoT). This capability provides enhanced security capabilities as required by authorities for sensitive venues and events.

72 Claims, 4 Drawing Sheets

IDENTIFICATIONS OF PATTERNS OF LIFE THROUGH ANALYSIS OF DEVICES WITHIN MONITORED VOLUMES

CLAIM TO PRIORITY

This Non-Provisional application claims under 35 U.S.C. § 120, the benefit of the Provisional Application 62/369,265, filed Aug. 1, 2016, Titled "Dignus Application and Facilitated Meetings" which is hereby incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Since 2007, a large proportion of human beings in the world have adopted the use of smart phones which they carry on their person as part of their daily routine. These smart phones have associated signatures and unique identifiers that, due to the constant proximity to the users who carry them, have become part of individual's personal identifiable information.

Over the last several years, the use of smart phones has been augmented by networked wearable smart devices, and other portable networked communication devices used by an ever-growing proportion of the world's population. Wearable devices are usually smart watches or similar. Portable devices include laptop computers, tablet computers, Bluetooth enabled cars, etc. These wearable or portable devices are frequently networked with each other, and are increasingly exchanging data with other devices and systems known as the Internet of Things (IoT). Each of these devices has a uniquely identifiable signature.

Moreover, as people tend to keep a radio frequency (RF)-emitting device for years, the unique identifiers associated with these RF-emitting devices has effectively become an enduring and consistent uniquely identifiable RF signature associated with the person that carries them. These RF signatures can be detected, measured, and used to identify an individual. This information can be used in environments where security is a concern.

It is the Freya system which refers to the hardware, software, and user interaction that comprise the system for monitoring defined volumes through detecting and capturing emissions and reflections from the electromagnetic spectrum, including the Radio Frequency (RF) spectrum, human-visible spectrum, infrared spectrum, ultraviolet spectrum, hyperspectral range, and acoustic pressure waves. The Freya system also comprises recording the captured emissions and reflections, creating one or more databases composed of the recorded multispectral information, and providing detailed analytics derived from the overlay of RF spectrum and/or video data, and/or acoustic waves from said one or more created databases.

Once the Freya system collects and stores this RF information into one or more defined databases, analytics can be drawn to provide significant intelligence about those emitters and associated humans present within the monitored volume. Freya provides unique identifiers for detected emitters; insights into the current network relationships between emitters, past and current; human relational networks within the monitored volume; and previous emitter locations prior to detection by the Freya system.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
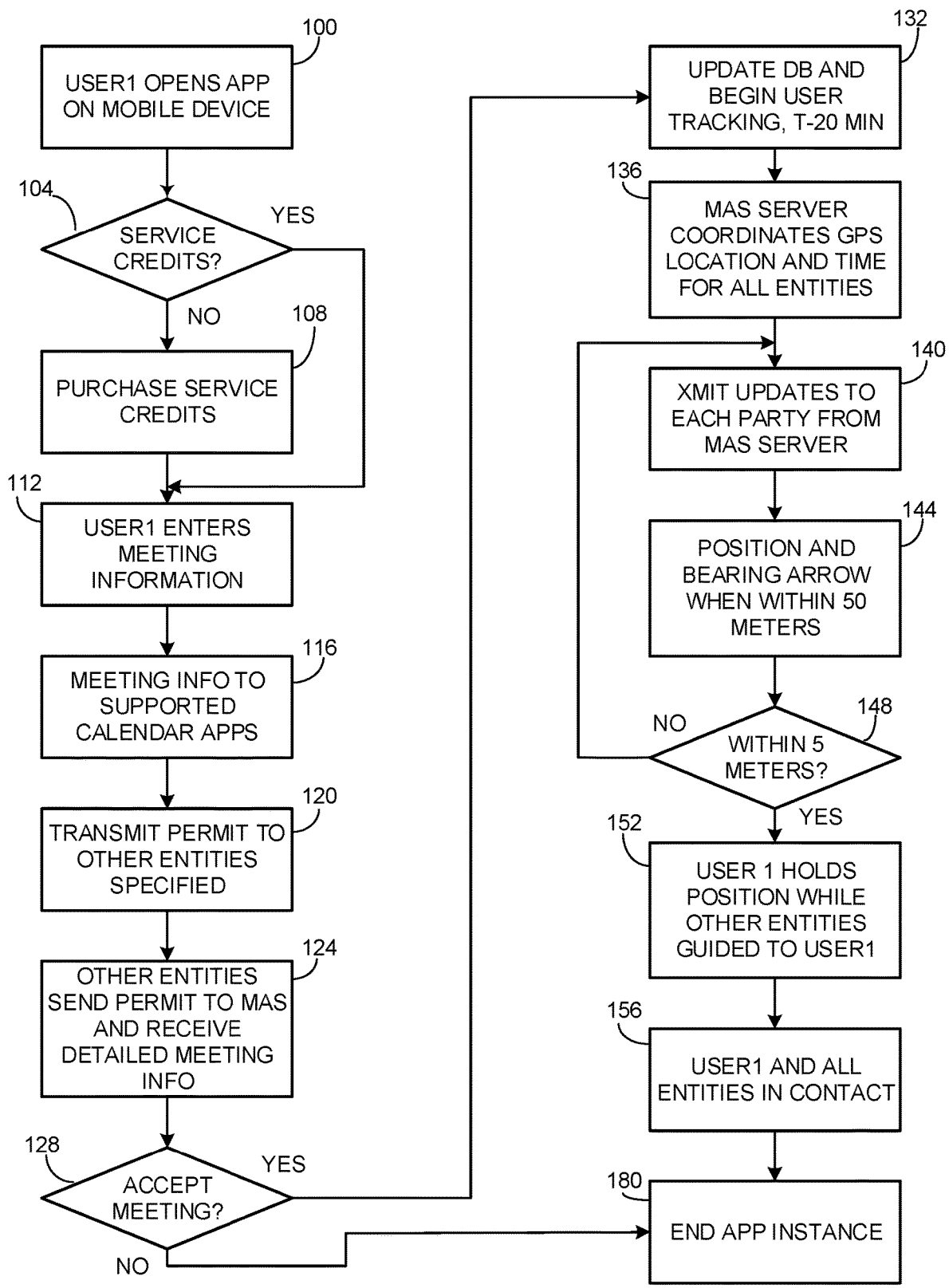
FIG. 1 is a flow diagram of the application logic flow for device location and meeting consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to the "Freya system" refers to the hardware, software, and user interaction that comprise the system for monitoring defined spatial volumes through detecting and capturing emissions and reflections from the electromagnetic spectrum, including the Radio Frequency (RF) spectrum, human-visible spectrum, infrared spectrum, ultraviolet spectrum, hyperspectral range, and acoustic pressure waves. The Freya system also comprises recording the captured emissions and reflections, creating one or more databases composed of the recorded multispectral information, and providing detailed analytics derived from the overlay of RF spectrum and/or video data, and/or acoustic waves from said one or more created databases.

Reference throughout this document to the "acoustic pressure wave" refers to an instance of a surface pressure wave, a sound pressure wave, an acoustic wave, acoustic radiation, or sound within or outside the human audible range.

Reference throughout this document to "monitored volume" refers to the three dimensional space within which the system for monitoring defined environments and controlled access environments, such as the Freya system, can detect all sensor, video, multimedia, and RF data and energy from RF, visible spectrum, infrared spectrum, ultraviolet spectrum, hyperspectral range, and acoustic pressure wave emitters or reflectors within a defined three-dimensional volume such as a sphere or other delineated volume. A monitored volume may be defined or modified dynamically. A dynamic monitored volume is a monitored volume where the shape and volume can vary as a function of time. A monitored volume may be static or mobile in three dimensional space. In a non-limiting example, a monitored volume sphere has a diameter that is directly related to the energy being broadcast by the various emitters located within the sphere and the gain of the antennas being used by the controlled environment monitoring system.

Reference throughout this document to the "Marco Application Server (MAS)" refers to one or more network capable and network connected servers configured to support and operate one embodiment of the Freya application and system called Marco.

Reference throughout this document to "pattern of life" refers to commonalities found in the manner in which human beings act and with whom they act. Patterns of life are derived from commonalities and correlations between collected data sets. These patterns of life provide information which assists in predictive analysis of future activity, location, or association.

In a non-limiting example, a pattern of life might be two individuals who work together and eat lunch together every weekday at noon at one of a defined number of restaurants they frequent. In another non-limiting example, a pattern of life can define a relationship between two otherwise unrelated individuals by correlation of their patterns of life, such as traveling through the same airport or same hotels. In another non-limiting example, a dynamic monitored volume can provide information about patterns of life of other individuals existing even briefly within one or more dynamic monitored volumes.

Reference throughout this document to "multispectral data" refers to data emitted from any number of regions of the electromagnetic spectrum. Multispectral data can be captured by electromagnetic sensors, RF receivers, video receivers, audio receivers, infrared receivers, microwave receivers, and other data capture devices to provide data captured to the Freya system from a plurality of spectra represented by two or more of the data capture devices.

Reference throughout this document to "electromagnetic spectrum data" refers to data derived from one or more regions of the entire range and scope of frequencies of electromagnetic radiation and their respective, associated photon wavelengths. Electromagnetic spectrum data can be captured by electromagnetic sensors, RF receivers, video receivers, audio receivers, infrared receivers, microwave receivers, and other data capture devices to provide data captured to the Freya system from a plurality of spectra represented by one or more of the data capture devices.

Reference throughout this document to a "unique emitter" refers to an emitter that has been found to be one of a kind based on one or more characteristics that are not found, and for which no equivalent is found, in any other entity within the monitored volume.

Reference throughout this document to a "unique identifier" refers to an emitter which alone, or in combination with other traits, creates a unique set of characteristics for an emitter, and permits that emitter to be singly identified from others in a sample group.

Reference throughout this document to "personal identifiable information (PII)" refers to any information that can be used to distinguish or trace an individual's identity.

Reference throughout this document to "non-repudiation" refers to the assurance that a statement or characteristics cannot be denied. This quality of non-repudiation is achieved when sufficient facts or evidence are amassed that compels a finding to be admitted as truth.

Reference throughout this document to "media access control address" or "MAC address" refers to a unique identifier assigned to a network interface associated with a computer. This identifier is present at the data link layer of the network segment.

Reference throughout this document to "hyperspectral data" refers to data from across the visible and non-visible light spectrum so as to obtain the breadth of the spectrum for every pixel in the image of the scene for the purpose of finding objects, identifying materials or material state, or detecting processes within the image. Hyperspectral data can be collected using a camera or other hyperspectral imaging systems to provide data captured to the sensor data collection system from a plurality of spectra represented by two or more sensors within any number of data capture devices.

A significant proportion of human beings carry on their person a smart phone, a smart watch, or other wireless networked wearable device which radiates RF, creating signatures and unique identifiers. These unique identifiers, due to the constant proximity to the users who carry them, have become part of individuals' personal identifiable information. These RF signatures can be detected, measured, and used to identify an individual.

Moreover, other devices such as portable devices, which include laptop computers, tablet computers, Bluetooth enabled cars, etc., provide additional uniquely identifiable signatures which further define the RF signature associated with a unique individual. Moreover, as people tend to keep an RF-emitting device for years, the unique identifiers associated with these RF-emitting devices have effectively become enduring, consistent, and uniquely identifiable RF signatures associated with the person that carries them.

These wearable or portable devices are frequently involved in network communication with each other, and are increasingly exchanging data with other devices and systems known as the Internet of Things (IoT). The nature of these network exchanges reveal not only the relationships between unique devices, but provides a view into previous network associations among devices. This information into previous network associations among devices allows the Freya system, through analytics and correlation with external databases, to identify previous locations for these portable unique identifiers. The information gained from these analytics provides a means to capture the travel locations and pattern of life for individuals associated with the emitters captured within the Freya monitored volume. In a non-limiting example, this information provided by the Freya system can be used in environments where security is a concern.

These smart phones, networked wearable devices, and associated emitters create uniquely identifiable RF patterns associated with individuals. These patterns can be used to identify the presence of a person within a monitored volume, provide analytics on the network communication between the devices within the monitored volume, and therefore derive insights on associations between individuals within the monitored volume. Additionally, these unique patterns can provide forensic data about the devices present in a monitored volume for a defined period. In such a circumstance, historical data can provide forensic evidence on the presence of a detected device within the monitored volume during a period of interest, and its the individual(s) associated with the detected device. The derived analytics also provide a historical trail of previous locations for devices detected within the monitored volume, subsequently producing analytics of associations between the detected emitters and other devices based on network interactions at previous locations whether within a monitored volume or exterior to a monitored volume.

In another embodiment, there is equally an issue that arises when there is a need to identify one or more individuals within a monitored volume. The need to identify one or more individuals may be associated with a person who wishes to locate another specific person, or a need to locate individuals within a monitored volume who correspond to a particular profile. There exists a need for an application that may anonymously provide identification, assurance, and specific location for individuals who are specified by one or more security authorities as individuals of interest or who are associated with a specific profile of individuals of interest.

In an alternative embodiment, needs of a security service or a secure environment may be met. Since the advent of the Communication Age, human beings with certain devices have acquired a distinct RF signature that can be associated with their person or entity. Most people keep their cell phone for years and, as a result, this information can be used in environments where security is a concern. An additional application may assist in fulfilling a need by security organizations guarding a sensitive venue, defined environment, or event to discover and associate more information with individuals and devices when they are passing through the monitored volume.

In this alternative embodiment, the application may be associated with a surveillance camera that is coupled with an RF sensing antenna array and is used to correlate RF emissions from someone or something in the camera's field of view. The camera may provide a video feed to a server which will correlate the RF emitter by using one or more directional antennas, and analyzed by customized algorithms correlating the RF source to an object or person within a camera's field of view. The Freya system may detect emissions using WiFi and Bluetooth protocols, as well as other RF signals defined as part of one or more additional wireless networking protocols. The Freya system may also detect acoustic pressure wave emissions as a means to augment pattern of life information within the monitored volume.

In this embodiment, the RF antenna array will be able to detect unique identifiers from phones emitting queries for embodiments of RF communications, for example Bluetooth and WiFi hot spots, other broadcast network information, as well as other RF communication implementations in its vicinity.

The antenna array and coupled camera system may provide an application operator with information on what RF emitters are correlated with a person or object within the camera's field of view defined by the video camera capture of the scene. Movement of the person or object through the camera's field of view may also correlate with collected WiFi and Bluetooth protocol information, as well as changes in the RF energy received by directional antennas in an array, enabling correlation between the objects and persons in the camera's field of view. This correlation may be tagged and identified by the application operator in conjunction with a database composed of this pattern of life information and the associated individual or entity. The pattern of life information is collected from within the monitored volume, and may be used to uniquely identify detected emitters. The information enables an ability to identify the presence of unique emitters, and compile a history of these detections within monitored volumes. This history becomes the basis for identifying an emitter's pattern of life. The pattern of life history may be stored in one or more database files associated with the Freya system. These databases may later be utilized as a basis for analysis and metrics on mobile devices, individuals, and entities in various locations within the monitored volume. However, a visual image is not a required data element to detect, identify, and reveal the pattern of life for a device emitting RF, WiFi signals, or other broadcast information within any monitored volume.

This system can enable an operator to identify whether a person in the camera's field of view has one or more phones or other broadcasting devices, and obtain information on these devices such as a MAC address, other unique identifiers, or grouping of identifiers that create a concatenated identifier associated with one or more wireless networking protocol(s) assigned for each phone or broadcasting device. When this information is recorded by the Freya system, a record is created of the visual representation from the camera and the RF signatures associated with it. These historical records of unique emitters and associated video may be used to enhance security monitoring of a monitored volume or other defined environments. The Freya system may thus provide forensic information to support and inform investigations following security events within the Freya system monitored volumes or other defined environments.

Additionally, security and law enforcement entities may benefit from more information being provided about an individual who is a suspect in the commission of a crime. In a non-limiting example, a suspect or perpetrator of a crime may mask or obscure their physical identity, but have a mobile device on their person. Capture by the Freya system of unique identifiers from the mobile device may provide information that shows that the perpetrator is co-located with the crime site at the date and time of a criminal action. The unique identifiers may form a chain of interactions with previously encountered RF and/or WiFi locations, permitting a retroactive trace back through locations with which the mobile device has recorded an interaction. Moreover, the Freya system and its analytics capability, drawing from its own and external databases, may also provide information as to previous locations of the captured mobile devices, providing significant insights into the associated individual's pattern of life. Additional information may be captured for later forensic analysis.

In an alternative embodiment, if a security organization is actively guarding a controlled environment, this organization may benefit from information about individuals that is ancillary to visible information available. Utilizing an infrared sensor, the infrared signature may provide information such as the temperature of the individual holding a mobile device that could indicate the presence of a fever associated with a communicable disease carried by that individual. Additionally, the Freya system can identify relationships amongst networked emitters over a span of time. Subsequently, it is possible to correlate between the emitter associated with the individual suspected of having a communicable disease and associates who arrive at the Freya monitored volume such as an airport at a later date. These associates may well have been exposed to the communicable disease, yet show no symptoms. The Freya system may provide the data correlating the sick individual with other asymptomatic communicable disease carriers in a manner that provides public health authorities with the time and information necessary to forestall disease transmission. Using additional Freya system capabilities, it is also possible to derive information on pattern of life and previous travel locations for symptomatic and asymptomatic individuals, thereby providing a means to better understand the possible source and potential transmission locations for a disease.

In an alternative embodiment, the collected information from various devices and subsequent analysis may indicate when the mobile device changes hands from one individual to another once both individuals are confirmed to be within a monitored volume. This is detected by identifying a change in the associations between the device emissions and other information from the monitored volume including data from the RF spectrum, visible spectrum, ultraviolet spectrum, infrared spectrum, hyperspectral range, and/or acoustic pressure waves.

In an embodiment, the Freya system may identify the history of the interaction of a WiFi device with past locations and systems with which the WiFi device has interacted. When entering a new location, a WiFi enabled device may broadcast an identification transaction message to determine if the WiFi enabled device is in proximity to a network or WiFi access point. Each WiFi device may broadcast a sequence of queries to determine if the WiFi device is within broadcast range of a previously encountered WiFi network access point.

In standard operation, the WiFi enabled device broadcasts a series of identification transaction messages in an effort to connect to a network or WiFi device with which the WiFi enabled device has previously interacted. The advantage of such broadcasts is to optimize connection and data transfer with any encountered network and/or other WiFi access point. The Freya system may capture the identity and location of every network and WiFi transmitter with which the WiFi enabled device has interacted and continues to query to create a file of locations the WiFi enabled device has encountered. The Freya system may analyze the file of locations to create a list of locations the user of the WiFi enabled device has visited.

The Freya system may also analyze the file locations for a particular WiFi enabled device and cross correlate this list of locations, as well as a range of time for each location visit, with those locations visited by other WiFi enabled devices. This cross correlation may permit the Freya system to form connections between WiFi enabled devices that have visited the same location within a defined span of time. Additionally, the Freya system may analyze the number of times such cross correlations have occurred to construct a determination of how strong the association may be between two or more WiFi enabled devices.

In an embodiment, the Freya system may also access and analyze publicly available databases to perform additional analysis to create metrics regarding locations and/or correlations between multiple WiFi enabled devices. The Freya system may also determine unique identifiers derived from emitted data associated with WiFi enabled devices to detect and understand whether and how WiFi enabled devices change location, are added to a monitored volume, and how these devices move through a particular monitored volume and/or move from one monitored volume to another.

These embodiments may be utilized in one or more non-limiting examples including but not limited to:

1. Monitored volumes such as those defined for airports, train stations, or large public events. In a non-limiting example, airport security personnel obtain information from the Freya system on people transiting through areas of the airport. When correlated with additional databases, this provides a real time alert to security personnel that a unique RF identifier associated with a known person of interest is present at the airport. In addition, using directional antennas and filters in one or more queries associated with this embodiment, security personnel are alerted to unusual patterns, such as a person with several cell phone devices, or an operating cell phone inside checked luggage. Another query filter enables security personnel to use Freya system directional antennas to provide an alert about a device being handed to one, or multiple, individuals during the course of a visit to an airport. The system also provides forensic information to security personnel after a security-related event. Such may be the case when an event occurs, and stored camera and correlated RF information can be used to obtain identities of those present at or near the event using law enforcement databases being queried with information obtained and stored by this embodiment of the system.

2. Monitored volumes such as those defined for large transportation hubs, or large public events. In a non-limiting example, public health officials with access to analytics from the Freya system identify an individual arriving from abroad whose thermal (infrared) signature depicts a high fever. Customs and Immigration authorities are alerted to the possibility that this individual may carry a communicable disease, and precautions are taken. Upon further evaluation of Freya system analytics derived from RF collection using directional antennas, it is determined that the sick individual's portable devices have previous common associations with the mobile devices of three other passengers arriving on a different flight later that day from the same point of origin. Although those three individuals are asymptomatic, the association with the original passenger afflicted with a fever enable public health authorities to take appropriate precautions.

3. Defined controlled-access environments such as schools, police stations, and government buildings. Much like the airport scenario, an alternative embodiment of the system is used in police vehicles, providing information to law enforcement on the RF signatures correlated to the picture on a video camera. This has the potential of being correlated to law enforcement databases. The system helps identify a known dangerous person in a stopped vehicle prior to the police officer making an approach to that vehicle. Also, in the event of a police officer being incapacitated, the information from the database records created and analyzed by the system is used after the fact to help identify the driver of the stopped vehicle, even if the stopped vehicle's license plate and description cannot be otherwise correlated to the perpetrator, such as in a stolen car scenario.
4. Interacting with both home and retail store security systems that detect video and RF to provide forensic evidence on the PII for any intruders to the home or retail location. In the event of a robbery, law enforcement can be provided with the database records retrieved from the Freya system server in order to correlate the video and monitored volume RF information as part of the evidence package that can be used to find and apprehend the perpetrator, even if the video does not provide visual clues to the identity of the perpetrator. In this case, the RF signature correlated by the system can be run against law enforcement databases, or become the trigger for subpoenas to cellular providers in order to identify the perpetrator in a manner that cannot be done today.
5. Banks, jewelry stores, convenience stores, or other merchant locations. This embodiment of the system is used to create a local record of those who frequent the store that is Freya system enabled. The analysis of recorded RF and video information in the monitored volume that is the retail or corporate location may provide a merchant with a better understanding of their customers. The analysis of the recorded RF and video information may enable the derivation of habits and shopping preferences for customers who frequent the retail or corporate locations.
6. The Freya system provides an automated means to take attendance in schools, classrooms, and workplaces. The Freya system can provide an accounting of employee presence in the workplace, as well as highlight those individuals who may not be authorized to be within a monitored volume within a school, classroom, or workplace.
7. The Freya system may be integrated with facial recognition software to provide for enhanced analytics from surveillance systems.
8. The analytics provided by the Freya system may enable identifying human relationships and human networks within groups. The analytics from Freya monitored volumes provide insight into the network associations common amongst two or more identified emitters. The larger the number of common past or current network association between emitters, the greater the probability that the individuals associated with those emitters know each other. For example, analytics from the Freya system would enable authorities to identify members of a criminal gang who have been identified in separate Freya monitored volumes, but whose networked device associations provide a strong correlation among those individuals.

Turning now to FIG. 1, this figure presents a flow diagram of the application logic flow for device location and meeting consistent with certain embodiments of the present invention. This embodiment of the Freya system is of two or more individuals who want to find each other through the use of smart phone devices while in a crowded environment, or by individuals who have never met and cannot recognize each other. This embodiment of the Freya system is called Marco and it uses monitored volumes which are both dynamic and mobile.

In an exemplary embodiment, a user may engage with the Marco app through the Marco Application Server (MAS) to facilitate an anonymous meeting. The individual or entity requesting the service from the Marco app is entitled "User1" when initiating the Marco app through a mobile device 100. The Marco app uses an electromagnetic and an acoustic sensor providing the process through which the monitored volume is monitored. In this non-limiting embodiment, User1 is interested in the product and wants to begin using the Marco app. Prior to initiating an anonymous meeting, User1 must first create an account with the MAS. Initiating the account may consist of User Registration for account validation via payment details, EULA Acceptance (Required), and Assignment of Unique Account Name, authentication information, and portal page access.

In this non-limiting embodiment, the account is created by the user on the registration page by entering the following data fields: User Name (shall be a unique identifier, not an email address), Phone Number, Payment Information, Full Name, Address, Credit Card Information, Email Address, and Password. When the account is successfully associated with the mobile device in the Marco database, the application will check to determine if User1 has available service credits to establish and coordinate a meeting 104. If User1 does not have any available service credits, User1 may be provided the opportunity to purchase such service credits 108. The Marco application may update the user database to create an account balance of available meeting permission credentials associated with the account, allowing the registered user (for instance, User1) to schedule a meeting. In a non-limiting example, after completing account creation and setup, User1 wants to set up a meeting. To accomplish this task, User1 opens the iPhone or Android Marco app, and clicks on the screen button to set up a new meeting. User1 receives feedback from the Marco app that a positive meeting permission credential balance is available for this meeting. User1 enters information into the Marco app regarding the meeting. The entry field will require the time for the meeting, date for the meeting, and the time zone in which User1 will be located at the time of the meeting. The other individuals or entities involved in the meeting will not be identified to the Marco app, and will not be part of the metadata associated with the meeting permission credential now tagged with time and date for the meeting. The meeting permission credential, which may be a token, cipher, certificate, or any other data construct that may be used as a credential, may be a custom data file type that is held inside the Marco app.

In a non-limiting embodiment, once the Marco application has determined that User1 has available service credits, the application prompts User1 to enter meeting information for the meeting to be facilitated 112. The Marco application transmits the meeting information entered by User1 to one or more calendar applications, such as by way of example and not of limitation, Google Calendar, to which User1 has indicated access 116. The Marco application may then transmit the meeting permission in the form of a meeting permit, which enables additional users and entities specified by User1 during the setup and establishment of the specific meeting to access the meeting information 120. At the specified date for the meeting all users and/or entities who are participating in the specified meeting transmit their meeting permit to the Marco application. Upon receipt of each meeting permit, the Marco application transmits detailed meeting information to each user or entity from which a meeting permit was received 124. Each user and/or entity may choose to accept or decline the physical meeting 128. If the user or entity declines the meeting, the Marco application dismisses the meeting from the database and the Marco application instance terminates 180.

If the user accepts the meeting, the Marco application is operative to update the database as to the date and time of the meeting. At a time 20 minutes prior to the pre-set meeting time, the Marco application begins guiding all parties to the meeting by establishing their individual geographic location 132. The Marco application coordinates geographic location and timing for all parties to achieve a meeting 136. The Marco application is also active to transmit updates regarding location and timing to all participates in the meeting 140. The Marco application continues guiding and updating until at least two participants in the meeting are within 50 meters of one another. At that time, the Marco application may transmit the position and an arrow indicating a vector which, if traversed, will bring the participants closer into physical proximity, where this vector arrow indicates a bearing from one participant to the User1 participant that initiated and coordinated the meeting 144.

In this embodiment, the Marco application may continue providing guidance updates until at least one participant is within 5 meters of User1 148. The Marco application may then determine distance between the mobile device associated with User1 and any other mobile device associated with any participant within 5 meters of User1 and bisect the distance in meters. The Marco application may then send bisected distance calculation to both devices now displaying direction and distance to move through space.

In this embodiment, when the calculated distance is 5 meters or less, User1 is instructed through the display on their mobile device to "Please wait while other party is guided to your location" 152. The Marco application may then refresh direction and distance calculation and instruct a participant to proceed, and then provide a similar refresh and instruction for each additional participant or entity that is verified for the meeting.

When both User 1 and User 2 are within 5 meters of each other, the Marco application may use non-human audible sounds, or exerted acoustic pressure waves, to provide additional locational information to the Marco application being used by User 1 and User 2.

The Marco application may send a "Greetings" message to each mobile device when the mobile device associated with User1 and each mobile device associated with an additional user or entity are calculated to be within 1 meter of one another.

In another embodiment, a system is defined for bringing two or more individuals together to co-location, each associated with a mobile device or smart phone. Marco creates dynamic monitored volumes for each individual's device, and brings said dynamic monitored volumes to coincidence in time and space. Marco does this by facilitating WiFi/Bluetooth proximity-based guidance. The Marco Application may initiate a WiFi/Bluetooth Proximity scanning algorithm. This algorithm begins with the Marco app building a data structure multi-dimensional array. This multi-dimensional array will contain elements for temporary recording, including "Bluetooth device address" (received from MAS), "WiFi device address" (received from MAS), signal strength of WiFi device address, the signal strength of Bluetooth device address, and a timestamp. App1 and App2 will populate elements for "Bluetooth device address" and "WiFi device address" with corresponding party's Bluetooth and WiFi hardware MAC address from the mobile device associated with the corresponding party. The mobile WiFi interface will scan nearby access points and compare WiFi hardware device beacons from nearby client devices to the mobile WiFi device address provided by MAS and store this information in the multi-dimensional array.

Upon detection of a corresponding WiFi signal by App1 or App2, the App token will update the WiFi device address signal strength field with the received signal strength in db. The Bluetooth implementation on the mobile device will then scan for Bluetooth hardware device beacons from nearby client devices for Bluetooth device address provided by MAS and stored in the multi-dimensional array. Signal strength values will be sent to MAS server in telemetry updates and MAS will calculate whether the distance between User1 and any other device scheduled to meet with User1 is increasing or decreasing by db strength increases or decreases for "target location verified". At this point the Marco application may use non-human audible sounds, or exerted acoustic pressure waves, to provide additional locational information to the Marco App1 and App2.

The MAS will send instruction to both Marco apps installed on the devices associated with User1 and any other device that the "Other party is within range". At this point, the meeting will be preliminarily assumed to have been facilitated and the Marco application meeting function of the Freya system will terminate 180.

Figure 2:
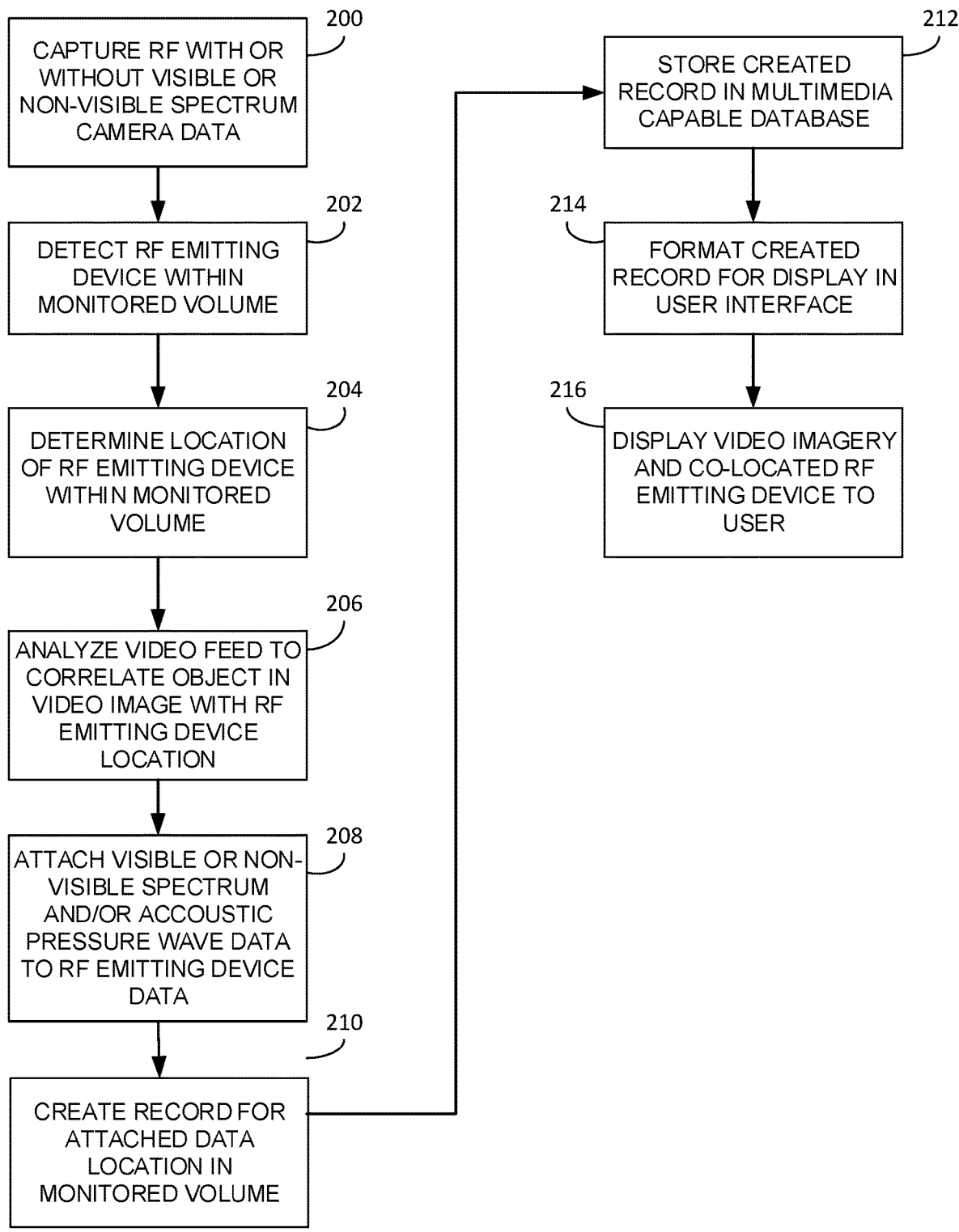
FIG. 2 is a view of the process flow for correlating video derived information with RF, infrared, and/or visible spectrum data forming multispectral data creation consistent with certain embodiments of the present invention.

Turning now to FIG. 2, this figure presents a view of the process flow for correlating system derived information with RF, visible spectrum, infrared spectrum, ultraviolet spectrum, and/or hyperspectral range data forming multispectral data creation consistent with certain embodiments of the invention. In an embodiment, the Freya system may detect WiFi, Bluetooth, or other Radio Frequency (RF) networking protocols; capture visible spectrum, infrared spectrum, ultraviolet spectrum, and/or hyperspectral range video; and provide detailed analytics derived from the overlay of these RF spectrum signatures and collected video data 200. The Freya system can also perform RF-detection and data analytics functions in the absence of visible spectrum and/or non-visible spectrum camera(s).

In an embodiment, the Freya system may utilize the results of the RF-detection function to determine the location of all RF emitting devices that are within the detection range of a monitored volume. Upon investigation of the located RF emitting devices, the Freya system would have the ability to correlate any derived representation of people in the monitored volumes with the collected RF-defined unique identities.

In a non-limiting embodiment, the Freya system may perform, but is not limited to, data capture from a live video feed from one or more cameras, depending on the volume that requires monitoring though visible spectrum or non-visible spectrum video. The live video feed, whether in the visible spectrum, infrared spectrum, ultraviolet spectrum, and/or hyperspectral range, may be analyzed to determine positions within the monitored volume that are co-located with RF broadcast data emitters detected using directional antennas. The Freya system may analyze the video feed from one or more cameras to isolate video of all detected RF-emitting device locations.

A WiFi receiver may pick up WiFi systems emitting as part of the protocol's network connectivity requirements and within the signal propagation limits of this protocol. A Bluetooth (protocol V1 through V3.x) receiver may pick up all Bluetooth systems emitting as part of the protocol's network connectivity requirements and within the signal propagation limits of this protocol. The Bluetooth (protocol V4.x, Bluetooth Low Energy (BLE)) receiver may pick up all Bluetooth v4.x/BLE systems emitting as part of the protocol's network connectivity requirements and within the signal propagation limits of this protocol. The Freya system is capable of capturing current and emerging RF networking protocols performing similar functions as Bluetooth and WiFi used in mobile devices and Internet of Things equipment.

The Freya system can define associations between detected RF emitters and objects within the Freya camera feed when both sensors are surveilling the same monitored volume. This capability visually depicts to an operator the Freya camera feed with overlayed RF emitter information associated with objects within the displayed picture.

A Freya system software module may create a database of the camera feed and detected RF emitting device data. The database records numerous data sets that may include the times of capture for WiFi station MAC addresses, the times of capture for WiFi access points MAC addresses, the times of capture for Bluetooth devices' MAC addresses, power levels associated with these data sets, the number of recorded beacons, and additional detected information that is assigned to individual data fields. The data stored within the Freya system database may be analyzed to provide metrics for each RF broadcast device within a particular monitored volume. The Freya system may also format the stored data record for display in a user interface. Upon completion of the formatting step, the Freya system may display the camera imagery within the monitored volume for each RF-emitting device, co-locating the video and/or infrared imagery with the physical location of each RF-emitting device, and display this location within the user interface display to one or more users.

In an embodiment, the Freya system may provide analytic data with regard to devices emitting RF data as such devices transit between various Freya monitored volumes. This, in conjunction with analytics on unique identifiers, provides analytics on personnel traffic flow between various Freya monitored volumes. The analysis module may correlate detected RF emissions with a visual identity within any of the visible spectrum, infrared spectrum, ultraviolet spectrum, and/or hyperspectral range fields of view to identify device owners within a monitored volume. This process may also identify individuals that lack an RF signature as this is becoming far less common, and can be attributed as a uniquely identifying characteristic. Information in the database can be queried to identify numerous as yet-undefined means to create patterns and relationships between previously seemingly unrelated entities within a Freya detection volume.

This capability of the Freya system may protect individual privacy by using private/public key encryption for transfer and storage of collected data. The encrypted data can be made available for use by authorities when needed for forensic investigations supporting security-related incidents. The Freya system may also detect and identify wireless networking protocols used by Internet of Things devices.

In this embodiment, the Freya system may begin monitoring a specified monitored volume by capturing any and all visible spectrum, ultraviolet, hyperspectral, or infrared image data from cameras, visible spectrum-capturing devices, ultraviolet, hyperspectral, and infrared cameras focused on the monitored volume 200. The Freya system may also detect all RF emitting devices within the monitored volume and collect the RF data from each device 202. The Freya system may then use directional antennas to determine the physical location, in real time, of each RF emitting device within the monitored volume 204. The Freya system may then analyze the visible spectrum, infrared spectrum, ultraviolet spectrum, and/or hyperspectral range camera data to isolate any image that may be associated with the physical location of any designated RF emitting device 206.

The Freya system may then attach the identified visible spectrum, ultraviolet, hyperspectral, or infrared image data to the RF data associated with the RF emitting device to create a record of the visible spectrum/ultraviolet/hyperspectral/infrared image, and RF data for each RF emitting device within the monitored volume using collection from one or more using directional antennas and algorithms 208. The Freya system may also attach collected acoustic pressure wave data to the RF data associated with the RF emitting device to create a record of the collected acoustic pressure waves and RF data for each RF emitting device within the monitored volume 208.

Once attached, the Freya system may create one or more records for attached data location in the monitored volume 210. These records may be stored in one or more databases 212. Such multimedia capable databases may be co-located with the Freya system, may be on servers geographically distant from the Freya monitored volume, or may be located within cloud storage. The Freya system may then format the created record for display in a user interface on a display associated with the Freya system 214 and display the video imagery and co-located RF emitting device to a user 216.

Figure 3:
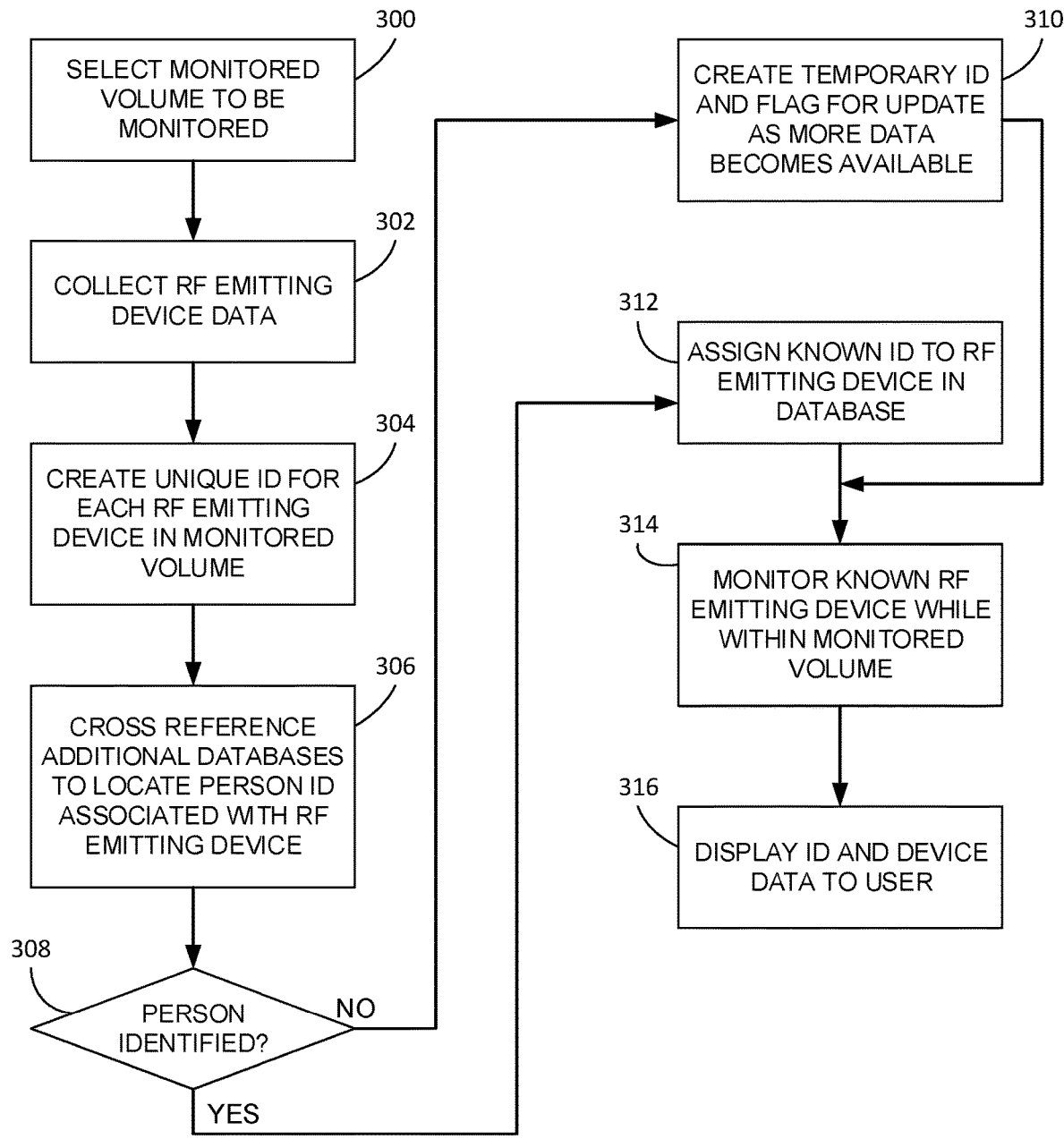
FIG. 3 is a view of the process flow for creating unique identifiers for unknown RF and other spectrum emitters in a monitored volume consistent with certain embodiments of the present invention.

Turning now to FIG. 3, this figure presents a view of the process flow for creating unique identifiers for unknown RF and other spectrum emitters in a monitored volume consistent with embodiments of the invention. In this embodiment, WiFi and Bluetooth can broadcast data that can translate to a unique identifier. If the data sets received by Freya do not contain a unique identifier derived from a single data entry, Freya can use the various data sets broadcast by each emitter to define a unique identifier for that emitter as shown in Tables 1 to 3 below. This is done by concatenating data sets from any combination of information derived from the WiFi protocol, Bluetooth protocol, both protocols, or other wireless networking protocols for every detected emitter to create a primary key that is unique to each emitter. This concatenated primary key can be used to identify previously detected emitters during future detection opportunities. The number of data sets that form a concatenated primary key can vary from one emitter to another, but consists of sufficient data sets such that any two emitters that are defined through a concatenated primary key cannot be confused with each other.

The Freya system can assign a unique identifier to emitters associated with human beings. Subsequently, if the need arises to identify an individual person from unique emitter identifiers, the Freya database can be cross-referenced with information from cellular service providers, wireless networking equipment manufacturers, and/or law enforcement to obtain a person's name that can provide a critical lead to an active investigation.

Data Collected from Bluetooth and WiFi Emitters
Bluetooth Data Fields

TABLE 1

| | | |
|---|---|---|
| id | uuid | name |
| status | address | uap_lap |
| vendor | appearance | company |
| company_type | imp_version | manufacturer |
| firmware | classic_mode | classic_service_uuids |
| classic_channels | classic_major_class | classic_minor_class |
| classic_class | classic_rssi | classic_tx_power |
| classic_features | classic_features_bitmap | le_mode |
| le_service_uuids | le_address_type | le_random_address_type |
| le_company_data | le_company_uuid | le_proximity_uuid |
| le_major_num | le_minor_num | le_flags |
| le_rssi | le_tx_power | le_features |

TABLE 1-continued

| le_features_bitmap | ibeacon_range | created_at |
|---|---|---|
| updated_at | last_seen | |

WiFi Station Data Fields

TABLE 2

| ID | station_mac | fseen |
|---|---|---|
| lseen | power | num_packets |
| BSSID | probed_essids | |

WiFi Access Point Data Fields

TABLE 3

| BSSID | fseen | lseen |
|---|---|---|
| channel | speed | privacy |
| cipher | authentication | power |
| num_beacons | ivs | lan_IP |
| id_length | ESSID | priv_key |

In a non-limiting embodiment, utilizing the data captured as disclosed in Tables 1-3, the Freya system may create a record of Personal Identifiable Information (PII) about an individual that is usually associated with any device or devices that are active within a monitored volume defined by the Freya system. The Freya system may use the PII to provide monitoring and/or forensic information associated with any device actively emitting RF data in a monitored volume. In a non-limiting example, a monitored volume may be active in a retail space, in a public building such as a school or school classroom, an exterior space such as a concert or sports venue, a heavily trafficked area such as an airport, or other transportation center, or any other volume that may be defined as a monitored volume. In this non-limiting example, and not by way of limitation, the Freya system may provide for an automated means for taking attendance in a classroom, discover and locate lost equipment containing any sort of RF emitter, identifying human interrelationships and human networks within groups, or understanding the characteristics of traffic flows in crowds or groups of people.

In an embodiment, the Freya system may be directed to focus on one or more monitored volumes defined for the system 300. The Freya system is operative to collect RF emitting device data 302. Upon collection of this data, the Freya system may create a unique Identifier (ID) for each RF emitting device located within the monitored volume 304. The Freya system may cross reference additional database information to locate the identification of a person that is normally, or usually, associated with the RF emitting device 306. If the Freya system cannot locate the identification of the person 308 normally associated with the RF emitting device, the Freya system may create a temporary ID for the RF emitting device 310. The temporary ID may be created by concatenating the unique device MAC address with a system permanent address to formulate a unique temporary ID that may be updated at a later time as more data about the RF emitting device becomes available to the Freya system 310.

If the identification of the person normally associated with the RF emitting device is located, this identification is assigned to the RF emitting device by including this personal identification within the record of the RF emitting device maintained by the Freya system 312. Upon determination of the identification to associate with the RF emitting device, the Freya system is active to monitor and collect pattern of life data for all identified RF emitting devices within a monitored volume 314. The data associated with the RF emitting device, including any person associated with the RF emitting device, may be formatted and displayed to a user of the Freya system 316.

Figure 4:
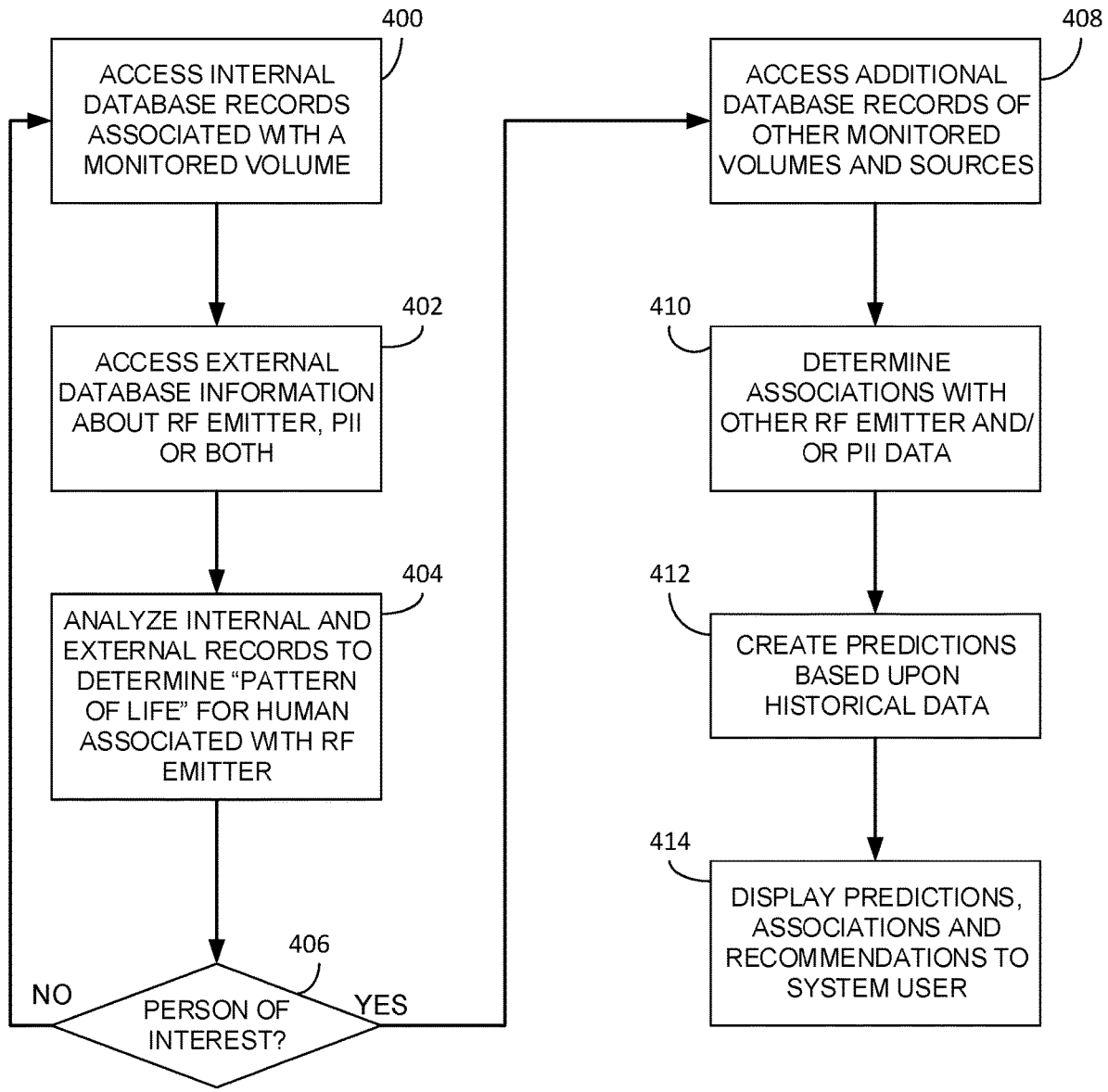
FIG. 4 is a view of the process flow for analyzing all collected monitoring and defining patterns of life for devices within a monitored volume for all spectra in which devices emit information, and providing metrics, predictions, and recommendations to a user consistent with certain embodiments of the present invention.

Turning now to FIG. 4, this figure presents a view of the process flow for analyzing all monitoring and collected pattern of life data for devices within a monitored volume for all spectra in which devices emit or reflect information and providing metrics, predictions, and recommendations to a user consistent with embodiments of the invention. In this embodiment, the Freya system collects and stores within one or more databases all PII data inclusive of any information that may be used to distinguish or derive an individual's identity. When the collected PII data is of a sufficient amount, the data may achieve a level of confidence sufficient that it may not be repudiated. The PII data may have amassed sufficient facts or evidence that the data set compels a finding to be admitted as truth, where statements or characteristics about the PII cannot be denied.

In an embodiment, the Freya system detects and records device information as previously described, as well as PII data, and stores all of this information into one or more database files. The Freya system is then active to analyze all collected and stored data to provide previously unknown information about the one or more monitored volumes from which the data was collected. In this embodiment, data collected may include data fields such as those presented in Tables 4-6.

Bluetooth Data Fields

TABLE 4

| id | uuid | name |
|---|---|---|
| status | address | uap_lap |
| vendor | appearance | company |
| company_type | imp_version | manufacturer |
| firmware | classic_mode | classic_service_uuids |
| classic_channels | classic_major_class | classic_minor_class |
| classic_class | classic_rssi | classic_tx_power |
| classic_features | classic_features_bitmap | le_mode |
| le_service_uuids | le_address_type | le_random_address_type |
| le_company_data | le_company_uuid | le_proximity_uuid |
| le_major_num | le_minor_num | le_flags |
| le_rssi | le_tx_power | le_features |
| le_features_bitmap | ibeacon_range | created_at |
| updated_at | last_seen | |

WiFi Station Data Fields

TABLE 5

| ID | station_mac | fseen |
|---|---|---|
| lseen | power | num_packets |
| BSSID | probed_essids | |

WiFi Access Point Data Fields

TABLE 6

| BSSID | fseen | lseen |
|---|---|---|
| channel | speed | privacy |
| cipher | authentication | power |
| num_beacons | ivs | lan_IP |
| id_length | ESSID | priv_key |

Each Freya system outputs its collected data into a relational database which can be searched. These searches address various attributes associated with collected data fields. The Freya databases use Structured Query Language (SQL) to mine data from relational databases, providing analytics—knowledge gained from mining vast amounts of data identifying correlations and associations from previous seemingly unrelated data.

The analytics derived from a Freya system database can be used for queries against one or more external databases to gain greater knowledge about the emitters within the Freya monitored volume(s). The Freya database can create an SQL Join to combine records from two or more tables in a database, thereby combining fields from two tables by using values common to each. Freya databases can also use the Union operator to combine data from two tables which have columns with the same datatype. When a Union is performed, the data from both tables is collected in a single column having the same datatype.

In an embodiment, the Freya system may provide current and historical output derived from collection of device and PII data from one or more monitored volumes for use in other database queries. These other databases may include those operated by law enforcement, customs and immigration, security agencies, and other governmental organizations. Integrating Freya analytics into these external processes provides knowledge that was previously unavailable, and can be used to vastly expand knowledge of 'who', 'what', 'when', and 'where' about detected devices within one or more monitored volumes. Freya analytics can also provide insights into the collected devices' pattern of life—a historical record of where the human associated with the device has travelled to, including specific geolocations.

In an embodiment, the Freya proprietary software may analyze the information stored within the one or more databases through an analytics engine to provide correlated relationships between emitters and individuals that are present within the area of detection, which is within a monitored volume or a portion of an identified monitored volume 400. Additionally, the system software may identify relationships between access points and nodes, which can be present or absent from the field of detection. The Freya system software may create a relational model between various emitters and devices, identifying correlations between the devices and the people who use these. This enables identification of whom may be traveling with whom by correlating which devices share common access points to define a relationship between individuals. The Freya system software may create a historical trail of previous networked device locations for detected devices using information about previous network access points. This creates an evidentiary trail of where a device has been prior to entry into the Freya-monitored volume.

In an embodiment, the Freya system software may provide analytics to identify correlations between networked emitters and individuals within the database and identify previously unknown contact history prior to entering one or more monitored volumes. In this embodiment, Freya sensor units and their databases can be shared in a network together, enabling data mining and a more robust understanding of unique RF-derived identities within a larger monitored volume.

The Freya infrared video data can be used to identify unique thermal signatures for individuals within the camera field of view, enabling the identification of those who may have a fever as an indicator of sickness or disease. The analytics engine associated with the Freya system may then derive unique identifying information about those individuals. This is important for transportation hubs where authorities want to minimize the spread of pathogens to other geographic areas.

In an embodiment, the Freya system can capture camera data in the ultraviolet portion of the electromagnetic spectrum. This provides capabilities to correlate detected multispectral data with the ultraviolet camera collection. Ultraviolet imagery provides information not available in the visible spectrum, such as residual traces of hazardous chemicals, organic residue, and forensic evidence found on textile fibers such as that used in suitcases or backpacks. This detected data can then be associated and correlated to collected multispectral data with unique RF or networking identifiers. In some instances, this type of collection can provide authorities with insights into hazardous materials/chemicals being brought in suitcases or carry-on luggage by travelers using mass transportation systems.

In an embodiment, the Freya system can capture hyperspectral imagery. This capability allows for the overlaid collection of data across the visible and non-visible light spectrum so as to obtain a wide breadth of the spectrum for every pixel in the image of the scene. Subsequently, this enables the Freya system with an ability to differentiate between organic and synthetic materials, and some variations in the chemical or physical composition of objects within the captured camera view. This is very useful for authorities as a means to identify undesired trace materials or chemicals on objects brought into a controlled monitored volume such as an airport or large public gathering.

In an embodiment, the Freya system can capture acoustic pressure waves. This capability allows for the overlaid collection of data across the human audible and non-audible range of acoustic pressure waves so as to obtain identifiers associated with a collected RF emitter. This can enable a capture of a human voice with its unique audible signatures, a distinctive sound such as a telephone custom ringtone, or a squeak in a shoe punctuated by a unique human walking gait. All of these acoustic pressure wave signatures can provide additional information associated with collected RF data.

The Freya databases are also able to retain historical data that can be queried against newly collected data, thereby providing analytics on historical patterns. This may include the frequency and historical correlations between any two or more emitters; an example of which is the identification of two unique emitters arriving every Tuesday at noon and departing at 4 PM every week. When these historical analytics are combined with unique identifiers, the Freya system can provide evidence approaching non-repudiation to investigations or inquiries.

In an embodiment, the Freya system may access local Freya database records associated with a monitored volume to review all device and PII data available within one or more monitored volumes 402. The Freya system may also access database records that are external to the Freya system that contain data about the RF emitting device, PII data, or both 402. The Freya system is operative to analyze local and external database records to determine pattern of life for the one or more human beings that are normally, or usually, associated with each RF emitting device 404. If the human and RF emitting device are not of interest 406, based upon user queries, the Freya system continues to analyze additional data for other devices, persons, and monitored volumes.

If an identified person is a person of interest to authorities, again based upon user queries, the Freya system may access additional database records of other monitored volumes and sources 408. The Freya system is operative to analyze the data from each monitored volume and/or source of data to determine historical data about locations of each RF emitting device and to draw associations and correlations between RF emitting devices and the humans associated with each RF emitting device 410. The Freya system may then create analytic predictions about the monitored emitters based upon historical data captured and stored within the Freya system 412. The Freya system may then display correlations, associations, predictions and recommendations with regard to each RF emitting device associated with a person of interest for the system user 414.

While certain illustrative embodiments have been described, it is evident that many alternatives, modifications, permutations and variations will become apparent to those skilled in the art in light of the foregoing description.

What is claimed is:

1. A system for detecting and correlating patterns of life through the detection of physical devices within a dynamic monitored volume, comprising:
    a sensor associated with a processor passively monitoring data being broadcast from any of a plurality of electromagnetic spectrum emitting devices;
    said processor defining a unique identifier for each of said electromagnetic spectrum data emitting devices;
    the processor to analyze received electromagnetic spectrum emitted data sets to catalog the various data sets being broadcast and the time of capture for said electromagnetic spectrum data emitting devices within said dynamic monitored volume;
    storing in a database associated with a server one or more created database records within said database and presenting any of said database records to a user upon user request;
    analyzing the electromagnetic spectrum emitted data sets, defining a unique emitter identifier, logging the time when the data sets were emitted, and identifying the monitored volume or volumes within which the data sets were emitted;
    storing the collected data on said server, and deriving analytics to define patterns of life comprising physical locations and patterns of movement within one or more monitored volumes associated with individuals through comparison of commonalities and correlations between collected data sets for said individuals;
    defining a relationship, utilizing said patterns of life, between at least two otherwise unrelated individuals within said dynamic monitored volume;
    displaying said derived patterns of life, said defined relationship, and analytics associated with the collected data to a user in a visual representation; and
    providing associations, predictions and recommendations to said user with regard to each emitting device location and said derived pattern of life and said defined relationship within each of said monitored volume or volumes.

2. The system of claim 1, further comprising displaying said created database records to a user in a visual representation of the monitored volume.

3. The system of claim 1, where a visual spectrum data portion of the electromagnetic spectrum data is captured by one or more of a camera, smartphone camera, or visible spectrum image capture device.

4. The system of claim 3, where the visual spectrum data captured is associated with one or more electromagnetic spectrum data emitting devices.

5. The system of claim 1, further comprising capturing infrared data by an infrared camera or other infrared capture device.

6. The system of claim 5, where the infrared data captured is associated with one or more electromagnetic spectrum data emitting devices.

7. The system of claim 1, further comprising capturing ultraviolet data by an ultraviolet camera or other ultraviolet capture device.

8. The system of claim 7, where the ultraviolet data captured is associated with one or more electromagnetic spectrum data emitting devices.

9. The system of claim 1, further comprising capturing hyperspectral data by a hyperspectral camera or other hyperspectral capture device.

10. The system of claim 9, where the hyperspectral data captured is associated with one or more electromagnetic spectrum data emitting devices.

11. The system of claim 1, further comprising capturing acoustic pressure wave data by an acoustic pressure wave microphone or other acoustic pressure wave capture device.

12. The system of claim 11, where the acoustic pressure wave data captured is associated with one or more electromagnetic spectrum data emitting devices.

13. The system of claim 1, further comprising creating data structures to provide correlations between data sets, metrics, and predictions associated with each electromagnetic spectrum data emitting device within a monitored volume.

14. The system of claim 13, further comprising determining points of correlation between electromagnetic spectrum emitting devices and the individuals carrying or associated with said electromagnetic spectrum data emitting devices.

15. The system of claim 1, where the created database records comprise text data, electromagnetic spectrum data, visual data, infrared data, ultraviolet data, hyperspectral data, and any other recorded data, metadata, or data added by a user.

16. The system of claim 1, where information derived from the collected data of one or more emitters provide information about the monitored emitter(s)' previous network associations with other devices outside of any monitored volume.

17. The system of claim 1, where knowledge obtained from the system is stored in a database, from which analytics are performed using databases associated with the system or external to the system, where a pattern of life for the individual or group associated with a monitored electromagnetic spectrum data emitter is derived.

18. The system of claim 1, further comprising a processor that provides for the discovery, interpretation, and communication of meaningful patterns in the data records stored within the one or more databases, requesting an analysis of the stored data records, and displaying the analysis results to provide feedback and answers to the requestor.

19. The system of claim 1, where monitored sensors operating within two or more monitored volumes are aggregated to create a larger, combined sensor array.

20. The system of claim 1, where two or more databases containing electromagnetic spectrum data or metadata aggregate data through a network connection.

21. A system for detecting and correlating patterns of life through the detection of physical devices within a dynamic monitored volume, comprising:
    a sensor associated with a processor passively monitoring data being broadcast from any of a plurality of wireless networking protocol emitting devices;

said processor defining a unique identifier for each of said wireless networking protocol data emitting devices;

analyzing received wireless networking protocol data sets to catalog the various data sets being broadcast and the time of capture for said wireless networking protocol data emitting devices within said dynamic monitored volume;

storing one or more created database records within a database and presenting any of said database records to a user upon user request;

analyzing the wireless networking protocol emitted data sets, defining a unique emitter identifier, logging the time when the data sets were emitted, and identifying the monitored volume or volumes within which the data sets were emitted;

storing the collected data on said server, and deriving analytics to define patterns of life comprising physical locations and patterns of movement within one or more monitored volumes associated with individuals through comparison of commonalities and correlations between collected data sets for said individuals;

defining one or more relationships, utilizing said patterns of life, between two or more otherwise unrelated individuals within said dynamic monitored volume;

displaying said derived patterns of life, said defined relationships, and analytics associated with the collected data to a user in a visual representation; and providing associations, predictions and recommendations to said user with regard to each emitting device location and said derived pattern of life and said defined relationships within said monitored volume or volumes.

22. The system of claim 21, further comprising displaying said created database records to a user in a visual representation of the monitored volume.

23. The system of claim 21, where a visual spectrum data portion of the wireless networking protocol is captured by one or more of a camera, smartphone camera, or visible spectrum image capture device.

24. The system of claim 23, where the visual spectrum data captured is associated with one or more wireless networking protocol data emitting devices.

25. The system of claim 21, further comprising capturing infrared data by an infrared camera or other infrared capture device.

26. The system of claim 25, where the infrared data captured is associated with one or more wireless networking protocol data emitting devices.

27. The system of claim 21, further comprising capturing ultraviolet data by an ultraviolet camera or other ultraviolet capture device.

28. The system of claim 27, where the ultraviolet data captured is associated with one or more wireless networking protocol data emitting devices.

29. The system of claim 21, further comprising capturing hyperspectral data by a hyperspectral camera or other hyperspectral capture device.

30. The system of claim 29, where the hyperspectral data captured is associated with one or more wireless networking protocol data emitting devices.

31. The system of claim 21, further comprising capturing acoustic pressure wave data by an acoustic pressure wave microphone or other acoustic pressure wave capture device.

32. The system of claim 31, where the acoustic pressure wave data captured is associated with one or more wireless networking protocol data emitting devices.

33. The system of claim 21, further comprising creating data structures to provide correlations between data sets, metrics, and predictions associated with each wireless networking protocol data emitting device within a monitored volume.

34. The system of claim 33, further comprising determining points of correlation between wireless networking protocol emitting devices and the individuals carrying and/or associated with said wireless networking protocol data emitting devices.

35. The system of claim 21, where the created database records comprise text data, wireless networking protocol data, visual data, infrared data, ultraviolet data, hyperspectral data, and any other recorded data, metadata, or data added by a user.

36. The system of claim 21, where information derived from the collected data of one or more emitters provide information about the monitored emitters' previous network associations with other devices outside of the any monitored volume.

37. The system of claim 21, where knowledge obtained from the system is stored in a database, from which analytics are performed using databases associated with the system or external to the system, where a pattern of life for the individual or group associated with a monitored wireless networking protocol data emitter is derived.

38. The system of claim 21, further comprising a processor that provides for the discovery, interpretation, and communication of meaningful patterns in the databased data, requesting an analysis of the stored data records, and displaying the analysis results to provide feedback and answers to the requestor.

39. The system of claim 21, where monitored sensors operating within two or more monitored volumes are aggregated to create a larger, combined sensor array.

40. The system of claim 21, where two or more databases containing wireless networking protocol data and/or metadata aggregate said data through a network connection.

41. The system of claim 21, where the wireless networking protocol is the WiFi wireless network protocol.

42. The system of claim 21, where the wireless networking protocol is the Bluetooth wireless network protocol.

43. A system for detecting and correlating patterns of life through the detection of physical devices within a dynamic monitored volume, comprising:

a sensor associated with a processor passively monitoring data being broadcast from any number of acoustic pressure wave emitting devices;

said processor defining a unique identifier for each of said acoustic pressure wave data emitting devices;

analyzing received acoustic pressure wave data to catalog the various data sets broadcast and the time of capture for said acoustic pressure wave data emitting devices within said dynamic monitored volume;

storing one or more created database records within a database and present any of said database records to a user upon user request;

analyzing the emitted data sets captured from said acoustic pressure wave emitting devices, defining the unique emitter identifier, logging the time when the data sets were emitted, and identifying the monitored volume or volumes within which the data sets were emitted;

storing the collected data on said server, and deriving analytics to define patterns of life comprising physical locations and patterns of movement within one or more monitored volumes associated with individuals through comparison of commonalities and correlations between collected data sets for said individuals;

defining a relationship, utilizing said patterns of life, between two or more otherwise unrelated individuals within said dynamic monitored volume;

displaying said derived patterns of life, said defined relationship, and analytics associated with the collected data to a user in a visual representation; and providing associations, predictions and recommendations to said user with regard to each emitting device location and said derived pattern of life and said defined relationship within said monitored volume or volumes.

44. The system of claim 43, further comprising displaying said created database records to a user in a visual representation of the monitored volume.

45. The system of claim 43, where a visual spectrum data portion of the acoustic pressure wave is captured by one or more of a camera microphone, smartphone microphone, or acoustic pressure wave capture device.

46. The system of claim 45, where the visual spectrum data captured is associated with one or more acoustic pressure wave data emitting devices.

47. The system of claim 43, further comprising capturing infrared data by an infrared camera or other infrared capture device.

48. The system of claim 47, where the infrared data captured is associated with one or more acoustic pressure wave data emitting devices.

49. The system of claim 43, further comprising capturing ultraviolet data by an ultraviolet camera or other ultraviolet capture device.

50. The system of claim 49, where the ultraviolet data captured is associated with one or more acoustic pressure wave data emitting devices.

51. The system of claim 43, further comprising capturing hyperspectral data by a hyperspectral camera or other hyperspectral capture device.

52. The system of claim 51, where the hyperspectral data captured is associated with one or more acoustic pressure wave data emitting devices.

53. The system of claim 43, further comprising creating data structures to provide correlations between data sets, metrics, and predictions associated with each acoustic pressure wave data emitting device within a monitored volume.

54. The system of claim 53, further comprising determining points of correlation between acoustic pressure wave emitting devices and the individuals carrying and/or associated with said acoustic pressure wave data emitting devices.

55. The system of claim 43, where the created database records comprise text data, acoustic pressure wave data, electromagnetic spectrum data, visual data, infrared data, ultraviolet data, hyperspectral data, and any other recorded data, metadata, or data added by a user.

56. The system of claim 43, where information derived from the collected data of one or more emitters provide information about the monitored emitter(s)' previous network associations with other devices outside of any monitored volume.

57. The system of claim 43, where knowledge obtained from the system is stored in a database, from which analytics are performed using databases organic to the system or external to the system, where a pattern of life for the individual or group associated with a monitored acoustic pressure wave data emitter is derived.

58. The system of claim 43, further comprising providing for the discovery, interpretation, and communication of meaningful patterns in the databased data, and a system to request these analytics, and a display system to provide feedback and answers to the requestor.

59. The system of claim 43, where data obtained from monitored sensors at two or more monitored volumes is aggregated to create a sensor array.

60. The system of claim 43, where two or more databases containing acoustic pressure wave data and/or metadata aggregate said data through a network connection.

61. The system of claim 1, where an electromagnetic spectrum data emitting device is any of smart watches, smart phones, portable phones, tablet computers, laptop computers, desktop computers, vehicles, beacons, and/or any other device configured to transmit the RF data portion from the electromagnetic spectrum data.

62. The system of claim 21, where a wireless network protocol data emitting device is any of smart watches, smart phones, portable phones, tablet computers, laptop computers, desktop computers, vehicles, beacons, or any other device configured to communicate using wireless network protocol(s).

63. The system of claim 43, where an acoustic pressure wave emitting device is any of smart watches, smart phones, portable phones, tablet computers, laptop computers, desktop computers, vehicles, beacons, any other device configured to broadcast acoustic pressure waves, or acoustic pressure waves intentionally or unintentionally broadcast by a device within any medium that propagates said acoustic pressure waves.

64. A system for bringing two or more individuals, each associated with a mobile device or smart phone to co-location by creating dynamic monitored volumes for each individual, and bringing said dynamic monitored volumes to coincidence in time and space;

said system deriving analytics from said dynamic monitored volumes for each individual to define patterns of life comprising physical locations and patterns of movement within one or more monitored volumes associated with individuals through comparison of commonalities and correlations between collected data sets for said individuals; and defining a relationship, utilizing said patterns of life, between the said two or more individuals within said dynamic monitored volumes and displayed said defined relationship to a user on a display device.

65. The system of claim 64, further comprising two or more monitored volumes.

66. The system of claim 64, where each dynamic monitored volume is monitored by a sensor that is on or that travels with each of the individuals, and that is associated with any of smart watches, smart phones, portable phones, tablet computers, laptop computers, desktop computers, vehicles, or any other device configured to receive electromagnetic spectrum data or acoustic data.

67. The system of claim 1, where the RF sensors in a monitored volume are located on a mobile platform such as an automobile, an airborne drone, an unmanned air vehicle, or carried by an individual who is in motion.

68. The system of claim 21, where the wireless network sensors in a monitored volume are located on a mobile platform such as an automobile, an airborne drone, an unmanned air vehicle, or carried by an individual who is in motion.

69. The system of claim 1, where the detected RF data is associated with an object in a camera's field of view by using one or more directional antennas.

70. The system of claim 21, where the detected wireless communication data is associated with an object in a camera's field of view by using one or more directional antennas.

71. The system of claim 64, each mobile device or smart phone emitting coded acoustic pressure waves with a predetermined energy level from one or more devices; and receiving the acoustic pressure wave by a second device associated with each individual, determining distance and general direction, and directing each individuals' motion so as to close the determined distance and bring said individuals to coincidence in time and space.

72. The system of claim 64, where each mobile device or smart phone emitting coded light signals with a predetermined energy level from one or more devices; and receiving the coded light signals by a second device associated with each individual, determining distance and general direction, and directing each individuals' motion so as to close the determined distance and bring said individuals to coincidence in time and space.

\* \* \* \* \*